United States Patent
Goto

(10) Patent No.: US 8,918,500 B2
(45) Date of Patent: Dec. 23, 2014

(54) COMMUNICATION APPARATUS, COMMUNICATION METHOD THEREFOR, PROGRAM, AND STORAGE MEDIUM

(75) Inventor: Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 589 days.

(21) Appl. No.: 12/996,484

(22) PCT Filed: Apr. 14, 2009

(86) PCT No.: PCT/JP2009/001702
§ 371 (c)(1),
(2), (4) Date: Dec. 6, 2010

(87) PCT Pub. No.: WO2009/150777
PCT Pub. Date: Dec. 17, 2009

(65) Prior Publication Data
US 2011/0082932 A1    Apr. 7, 2011

(30) Foreign Application Priority Data
Jun. 10, 2008   (JP) ................................ 2008-151823

(51) Int. Cl.
*G06F 15/173*    (2006.01)
*H04W 28/18*    (2009.01)
*H04W 84/18*    (2009.01)
*H04W 24/00*    (2009.01)

(52) U.S. Cl.
CPC .............. *H04W 28/18* (2013.01); *H04W 84/18* (2013.01); *H04W 24/00* (2013.01)
USPC ............ 709/224; 709/220; 709/228; 370/352

(58) Field of Classification Search
CPC ...... H04W 28/18; H04W 24/00; H04W 84/18
USPC ............................ 709/228, 223–224; 370/252
See application file for complete search history.

(56) References Cited

U.S. PATENT DOCUMENTS

| | | | |
|---|---|---|---|
| 6,983,324 B1 * | 1/2006 | Block et al. | 709/228 |
| 7,697,932 B2 * | 4/2010 | Nakajima | 455/435.1 |
| 7,716,346 B2 * | 5/2010 | Suzuki et al. | 709/228 |
| 7,882,196 B2 * | 2/2011 | Fujii et al. | 709/208 |

(Continued)

FOREIGN PATENT DOCUMENTS

EP    1450523 A    8/2004
EP    1718012 A    11/2006

(Continued)

OTHER PUBLICATIONS

U.S. Appl. No. 13/124,203, filed Apr. 14, 2011, Fumihide Goto.

(Continued)

*Primary Examiner* — Oanh Duong
(74) *Attorney, Agent, or Firm* — Carter, DeLuca, Farrell & Schmidt, LLP

(57) ABSTRACT

When a communication apparatus instructed to perform an automatic setting process detects an existing network, the communication apparatus monitors whether a communication apparatus that is in the existing network and that has a communication-parameter providing function starts an automatic setting process. When the communication apparatus in the existing network starts an automatic setting process, the communication apparatus receives communication parameters provided from the communication apparatus in the existing network.

4 Claims, 9 Drawing Sheets

(56) References Cited

U.S. PATENT DOCUMENTS

| | | | |
|---|---|---|---|
| 8,103,003 B2 * | 1/2012 | Hiroki | 380/270 |
| 8,233,405 B2 * | 7/2012 | Sakai | 370/254 |
| 2002/0147819 A1 * | 10/2002 | Miyakoshi et al. | 709/228 |
| 2003/0115339 A1 * | 6/2003 | Hodoshima | 709/228 |
| 2006/0067336 A1 * | 3/2006 | Matsuda | 370/397 |
| 2006/0246941 A1 * | 11/2006 | Watanabe et al. | 455/552.1 |
| 2006/0282541 A1 * | 12/2006 | Hiroki | 709/228 |
| 2007/0088951 A1 * | 4/2007 | Nakajima | 713/171 |
| 2007/0100972 A1 | 5/2007 | Otsuka | |
| 2007/0189322 A1 * | 8/2007 | Hirose | 370/447 |
| 2007/0197238 A1 * | 8/2007 | Nakajima | 455/466 |
| 2007/0223670 A1 | 9/2007 | Ido | |
| 2008/0026795 A1 | 1/2008 | Fujii | |
| 2008/0089300 A1 | 4/2008 | Yee | |

FOREIGN PATENT DOCUMENTS

| | | | |
|---|---|---|---|
| JP | 2002-344458 A | 11/2002 | |
| JP | 2003-078531 A | 3/2003 | |
| JP | 2007-143117 A | 6/2007 | |
| JP | 2007-258822 A | 10/2007 | |
| WO | 2005/067265 A | 7/2005 | |

OTHER PUBLICATIONS

U.S. Appl. No. 13/122,619, filed Apr. 5, 2011, Fumihide Goto.
U.S. Appl. No. 13/122,558, filed Apr. 4, 2011, Tatsuhiko Sakai.
U.S. Appl. No. 13/120,535, filed Mar. 23, 2011, Fumihide Goto.
U.S. Appl. No. 13/061,124, filed Feb. 25, 2011, Tatsuhiko Sakai.
U.S. Appl. No. 12/989,070, filed Oct. 21, 2010, Tatsuhiko Sakai.
U.S. Appl. No. 12/988,781, filed Oct. 20, 2010, Tatsuhiko Sakai.
U.S. Appl. No. 13/140,814, filed Jun. 17, 2011, Tatsuhiko Sakai.
U.S. Appl. No. 12/748,771, filed Mar. 29, 2010, Masahiro Nagatani.
Japanese Office Action dated Sep. 25, 2012 issued in corresponding application No. 2008-151823.

* cited by examiner

COMMUNICATION APPARATUS, COMMUNICATION METHOD THEREFOR, PROGRAM, AND STORAGE MEDIUM

TECHNICAL FIELD

The present invention relates to communication apparatuses, communication methods therefor, programs, and storage media.

BACKGROUND ART

In wireless communication represented by wireless local area networks (LANs) conforming to the Institute of Electrical and Electronics Engineers (IEEE) 802.11 standard series, there are many setting items that must be set prior to use.

For example, as setting items, there are communication parameters needed to perform wireless communication, such as the Service Set Identifier (SSID) which is a network identifier, an encryption method, an encryption key, an authentication method, and an authentication key. It is very complicated for the user to manually enter and set these communication parameters.

Therefore, various manufacturers have devised automatic setting methods for easily setting communication parameters in wireless devices. In these automatic setting methods, one device provides communication parameters to another device connected thereto, using a procedure and messages determined in advance between these connected devices, and accordingly the communication parameters are automatically set.

Wi-Fi Protected Setup discloses an example of automatically setting communication parameters.

In this example where automatic setting is performed, there are two methods, one involving the user to enter an authentication code to a device (hereinafter called an authentication code method), and the other not involving the user to enter an authentication code (hereinafter called a non-authentication code method) (see Non Patent Citation 1 for details).

The authentication code method performs an authentication process in devices using the entered authentication code. If the authentication process is successful, one device provides communication parameters to the other device, and the other device receives the communication parameters. In this case, the devices can securely share the communication parameters by performing the authentication process.

In the non-authentication code method, when a terminal starting a communication-parameter automatic setting process is detected, communication parameters are automatically provided to the detected device. An example of the non-authentication code method is a method of starting a setting process in response to pressing of a setting start button provided in a device and performing automatic setting with another device that has similarly started a setting process during the setting process (hereinafter called a button pressing method). The non-authentication code method is inferior to the authentication code method in security. However, since the user need not enter the authentication code, there is an advantage that the operation becomes simpler.

The button pressing method automatically sets communication parameters simply by pressing the setting start button provided in a device. Therefore, the button pressing method is suitable for built-in devices with poor user interfaces.

Non Patent Citation 1: Wi-Fi CERTIFIED™ for Wi-Fi Protected Setup: Easing the User Experience for Home and Small Office Wi-Fi® Networks, http://www.wi-fi.org/wp/wifi-protected-setup

DISCLOSURE OF INVENTION

Technical Problem

When the users of a plurality of wireless devices press setting start buttons almost at the same time, depending on the positional relationship among the devices, communication parameters may be automatically set in unintended devices.

For example, when there has already been a network configured by performing a communication-parameter automatic setting process, if setting start buttons of a plurality of communication apparatuses are pressed, it is impossible to uniquely tell whether these communication apparatuses are wishing to participate in the existing network or to configure a new network.

The present invention provides techniques for solving a problem that occurs in the case where a plurality of communication apparatuses performs a communication-parameter setting process.

Solution to Problem

The present invention provides techniques to monitor, in case that a communication apparatus that is in an existing network having been already configured by setting a communication parameter and that has not started a communication-parameter setting process and a communication apparatus that has not set a communication parameter yet and that has started a communication-parameter setting process are detected, whether the communication apparatus in the existing network starts a communication-parameter setting process, and, in case that it is detected that the communication apparatus in the existing network starts a communication-parameter setting process, to request the communication apparatus in the existing network to provide a communication parameter.

DESCRIPTION OF EMBODIMENTS

First Embodiment

A communication apparatus according to an embodiment of the present invention will now herein be described in detail with reference to the drawings. Although the following description concerns an example in which a wireless LAN system conforming to the IEEE 802.11 series is employed, the communication configuration is not necessarily limited to a wireless LAN conforming to IEEE 802.11.

An exemplary hardware configuration in the embodiment will be described.

Figure 1:
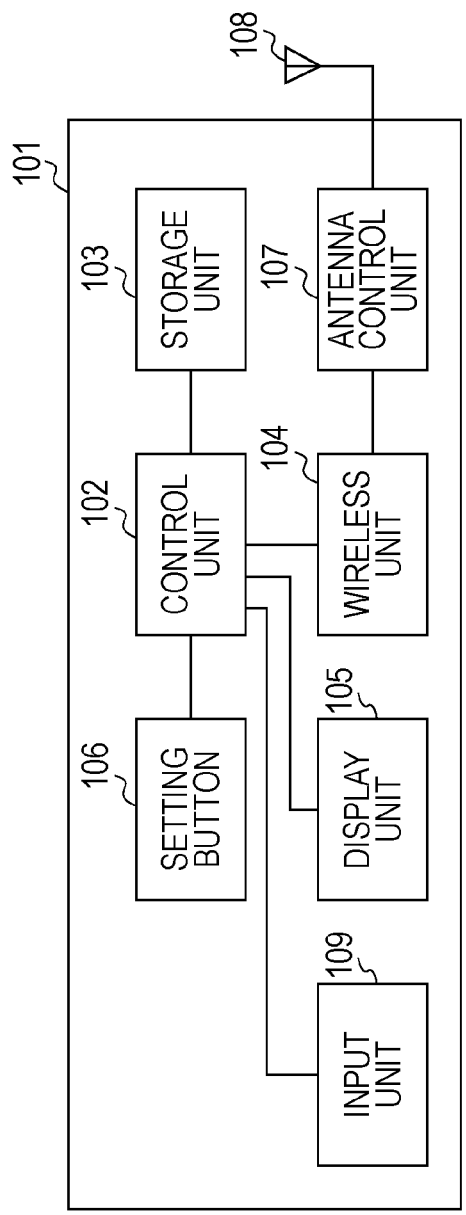
FIG. 1 is a block diagram of an apparatus.

FIG. 1 is a block diagram showing an exemplary structure of each apparatus, which will be described later, according to the embodiment of the present invention. FIG. 1 illustrates the entirety of an apparatus 101. A control unit 102 controls the entire apparatus 101 by executing a control program stored in a storage unit 103. The control unit 102 additionally controls setting of communication parameters with another apparatus. The storage unit 103 stores the control program executed by the control unit 102 and various items of information, such as communication parameters. Various operations described later are performed by executing, with the control unit 102, the control program stored in the storage unit 103.

A wireless unit 104 performs wireless LAN communication conforming to the IEEE 802.11 series. A display unit 105 performs various displays. The display unit 105 has a function of outputting information in a visually recognizable manner, as in a liquid crystal display (LCD) and/or a light-emitting diode (LED), or a function of outputting sounds, as in a loudspeaker.

A setting button 106 is used for triggering or starting a communication-parameter setting process. A communication-parameter automatic setting process starts when the setting button 106 is operated. Upon detection of an operation entered by a user using the setting button 106, the control unit 102 starts a process described later.

An antenna control unit 107 controls an antenna 108.

Figure 2:
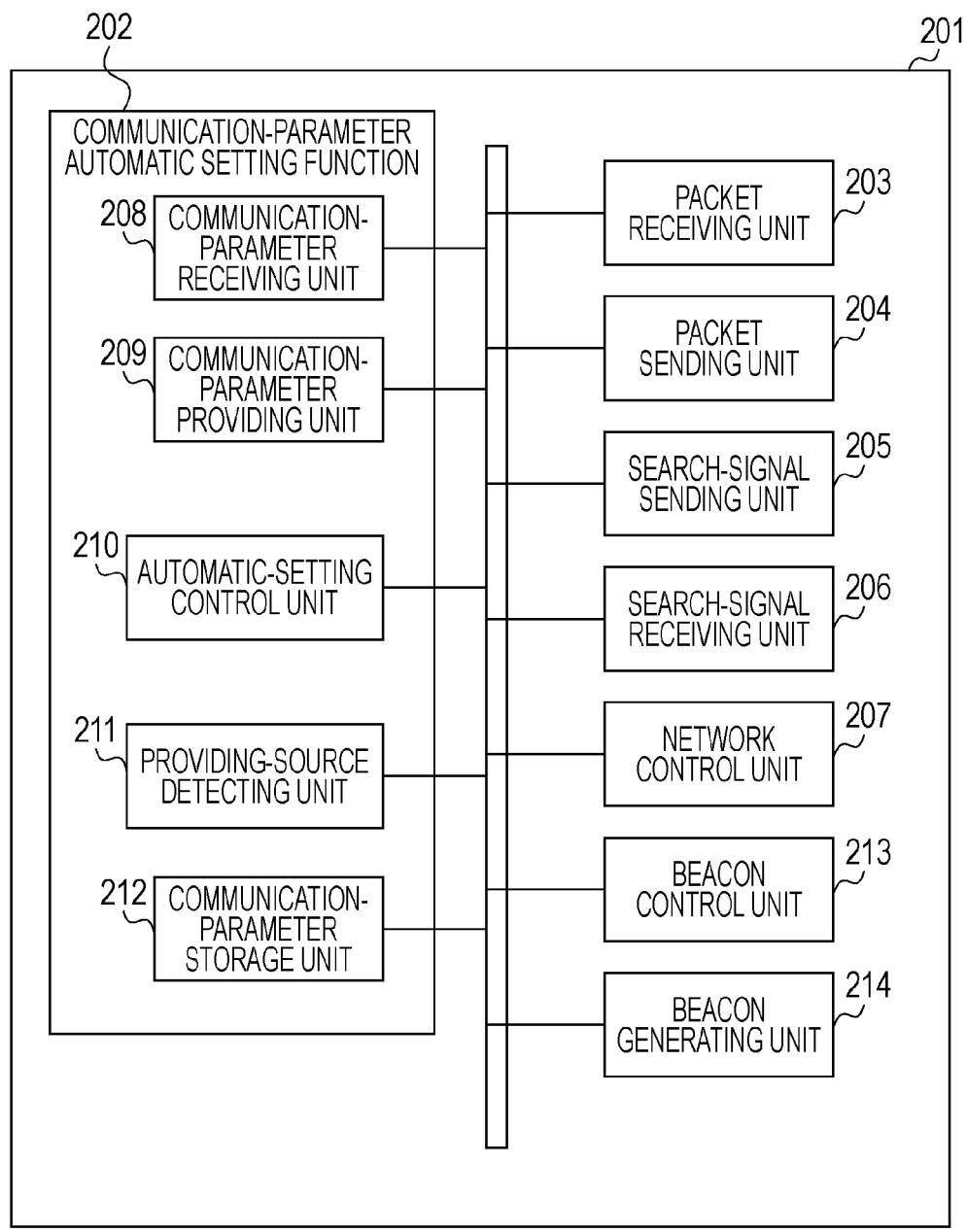
FIG. 2 is a software functional block diagram of the interior of the apparatus.

FIG. 2 is a block diagram illustrating an exemplary configuration of software function blocks that perform a communication-parameter automatic setting operation, which will be described later.

FIG. 2 illustrates the entirety of an apparatus 201. The apparatus 201 includes a communication-parameter automatic setting function block 202. In this embodiment, automatic setting of communication parameters needed to perform wireless LAN communication, such as the SSID which is a network identifier, an encryption method, an encryption key, an authentication method, and an authentication key, is performed. Hereinafter, automatic setting of communication parameters will be briefly called "automatic setting".

A packet receiving unit 203 receives packets related to various communications. Receiving of a beacon (broadcast signal) is performed by the packet receiving unit 203. A packet sending unit 204 sends packets related to various communications. Sending of a beacon is performed by the packet sending unit 204. Various items of information of the sending source device are added to a beacon.

A search-signal sending unit 205 controls sending of a device search signal, such as a probe request. A probe request may be a network search signal for searching for a desired network. Sending of a probe request is performed by the search-signal sending unit 205. Also, sending of a probe response, which is a response signal to a received probe request, is performed by the search-signal sending unit 205. In the present embodiment, when a user operates the setting button 106 and starts an automatic setting process, an information element (IE) indicating that currently automatic setting is being performed (during automatic setting operation) is added to a beacon, a probe request, and a probe response, and the beacon, probe request, and probe response having this information element are sent.

A search-signal receiving unit 206 controls receiving of a device search signal, such as a probe request, from another apparatus. Receiving of a probe request is performed by the search-signal receiving unit 206. Also, receiving of a probe response is performed by the search-signal receiving unit 206. Various items of information of the sending source device are added to a device search signal and a response signal in response thereto.

A network control unit 207 controls a network connection. A process of connecting to a wireless LAN ad-hoc network, for example, is performed by the network control unit 207.

In the communication-parameter automatic setting function block 202, a communication-parameter receiving unit 208 receives communication parameters from a partner device, and a communication-parameter providing unit 209 provides communication parameters to a partner device. An automatic-setting control unit 210 controls various protocols in automatic setting. An automatic setting process, which will be described later, is performed by the communication-parameter receiving unit 208 and the communication-parameter providing unit 209 under control of the automatic-setting control unit 210. In addition, the automatic-setting control unit 210 determines whether a time elapsed since the start of a communication-parameter automatic setting process has exceeded a time limit of the setting process. When it is determined that the elapsed time has exceeded the time limit, the automatic-setting control unit 210 performs control to terminate the automatic setting process.

A providing-source detecting unit 211 detects a communication-parameter providing apparatus. The providing-source detecting unit 211 detects a communication-parameter providing apparatus by sending and responding to a search signal, using the search-signal sending unit 205 and the search-signal receiving unit 206. Alternatively, the providing-source detecting unit 211 may detect a providing apparatus by receiving a beacon using the packet receiving unit 203. When a device wishes to receive provided communication parameters, the device requests a detected providing apparatus to provide communication parameters, and receives the provided communication parameters.

A communication-parameter storage unit 212 stores communication parameters provided from a providing apparatus. The communication-parameter storage unit 212 corresponds to the storage unit 103.

A beacon control unit 213 controls a sending timing of a beacon (broadcast signal). A beacon generating unit 214 generates a beacon. The generated beacon is sent to a network using the packet sending unit 204. All function blocks are correlated in terms of software or hardware. The foregoing function blocks are only exemplary. A plurality of function blocks may constitute one function block, or a function block may be divided into a plurality of blocks that perform a plurality of functions.

Figure 3:
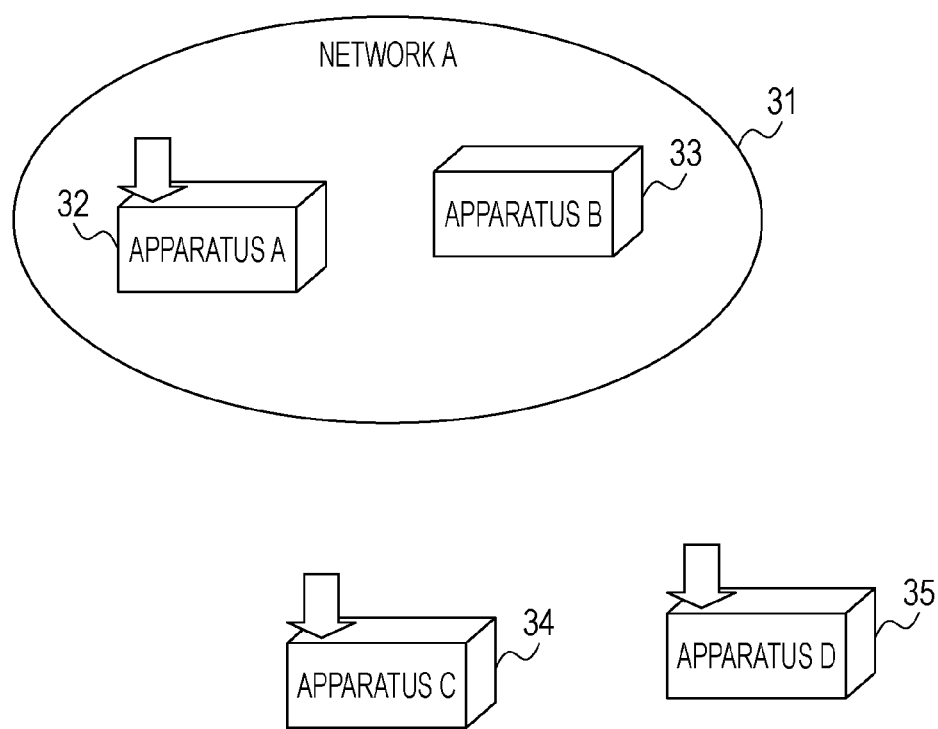
FIG. 3 is a network configuration diagram.

FIG. 3 is a diagram illustrating a communication apparatus A32 (hereinafter called an apparatus A), a communication apparatus B33 (hereinafter called an apparatus B), a communication apparatus C34 (hereinafter called an apparatus C), and a communication apparatus D35 (hereinafter called an apparatus D). All these apparatuses have the foregoing configurations shown in FIGS. 1 and 2.

The apparatus A stores, as a communication-parameter providing apparatus, configuration information of a network A31 (hereinafter called a network A). The apparatus B is a receiving apparatus that receives communication parameters from a providing apparatus. The apparatus B performs communication-parameter automatic setting with the apparatus A and receives communication parameters of the network A, which are provided from the apparatus A.

In the following description, the apparatus A corresponds to a communication-parameter providing apparatus that exists in the existing network A, and the apparatus B corresponds to a communication-parameter receiving apparatus that exists in the existing network A.

The network A is an ad-hoc network configured by the apparatuses A and B. The ad-hoc network is called an Independent Basic Service Set (IBSS). Each network is identified by a Basic Service Set Identifier (BSSID) which is a network identifier.

Now, the case where the apparatuses C and D perform a communication-parameter automatic setting process will be considered. A network after an automatic setting process is performed has one of two configurations: 1) all apparatuses are integrated in the same network A, as illustrated in FIG. 4; and 2) besides the network A generated by the apparatus A, a new network B is configured by the apparatuses C and D, as illustrated in FIG. 5.

Figure 4:
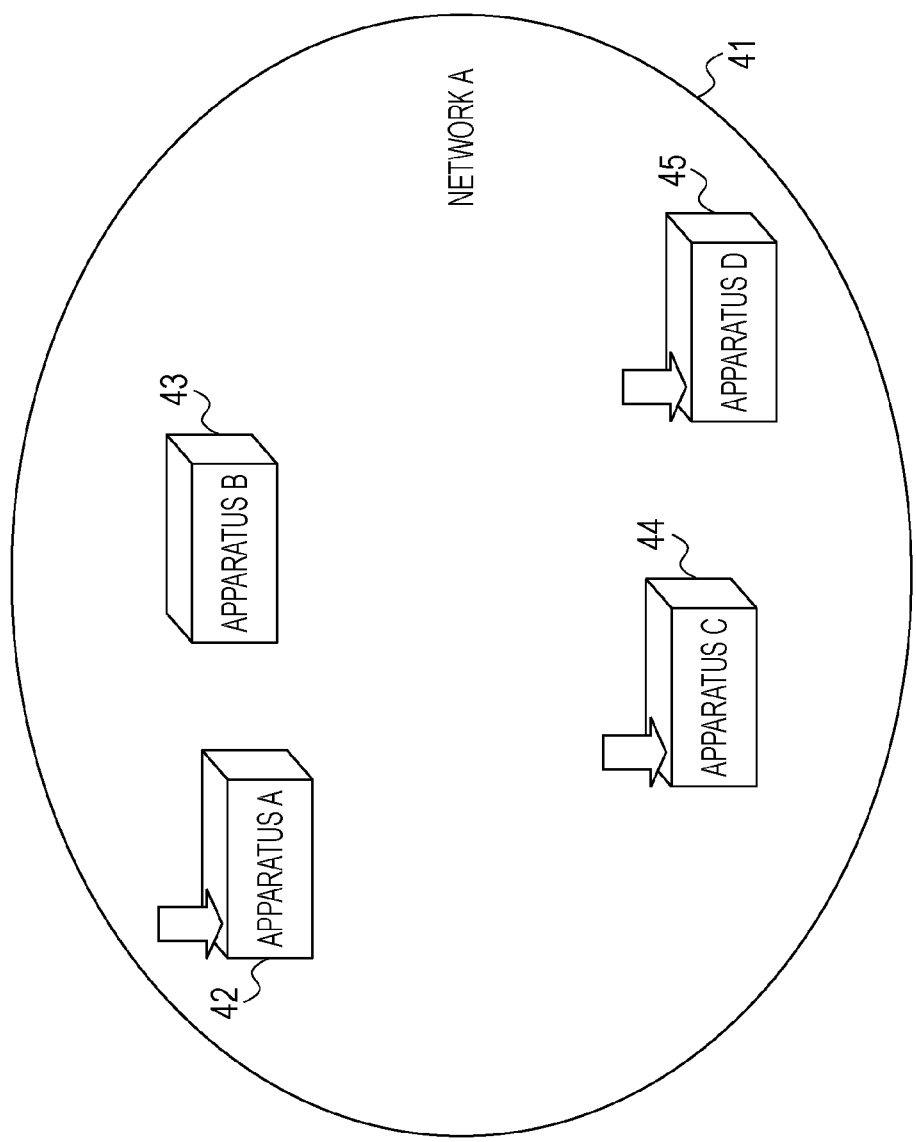
FIG. 4 is a network configuration diagram.
Figure 5:
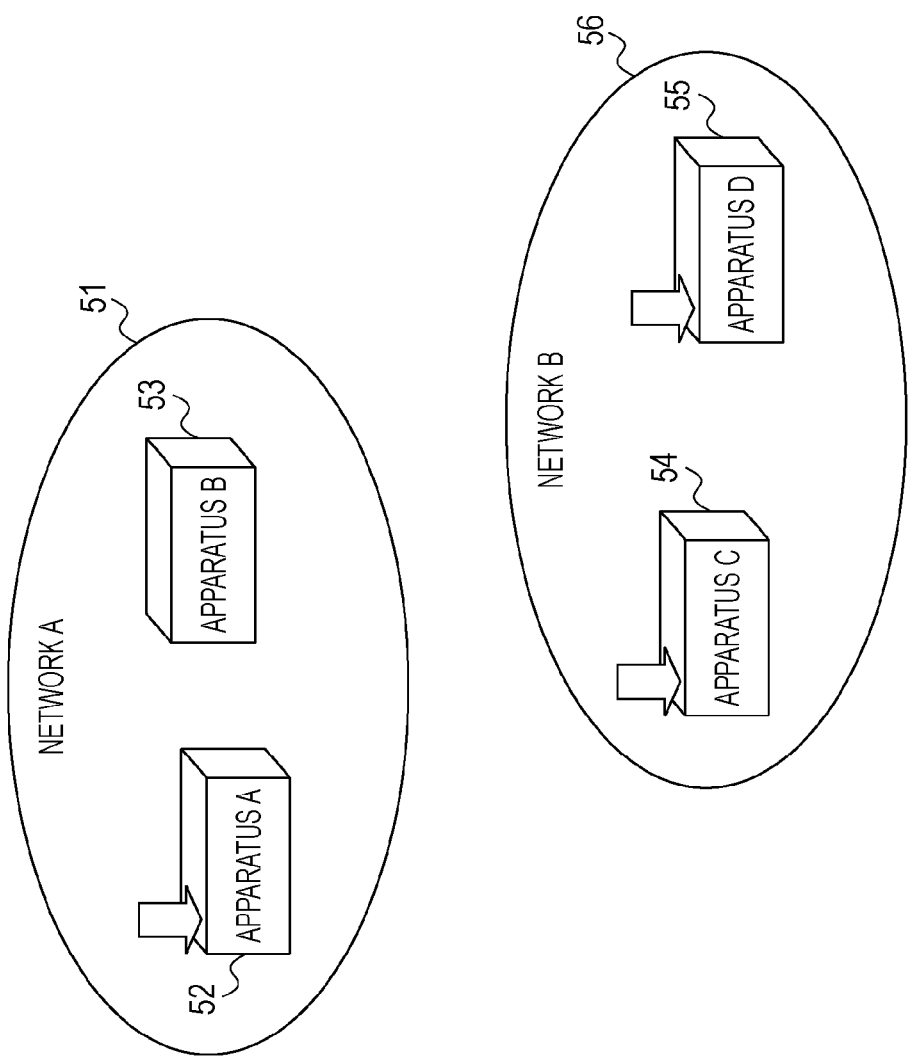
FIG. 5 is a network configuration diagram.

In the present embodiment, which one of the two configurations illustrated in FIGS. 4 and 5 is to be employed can be controlled by the user, who may or may not operate the setting button 106 of an apparatus included in the network A after the setting buttons 106 of the apparatuses C and D are operated.

Figure 9:
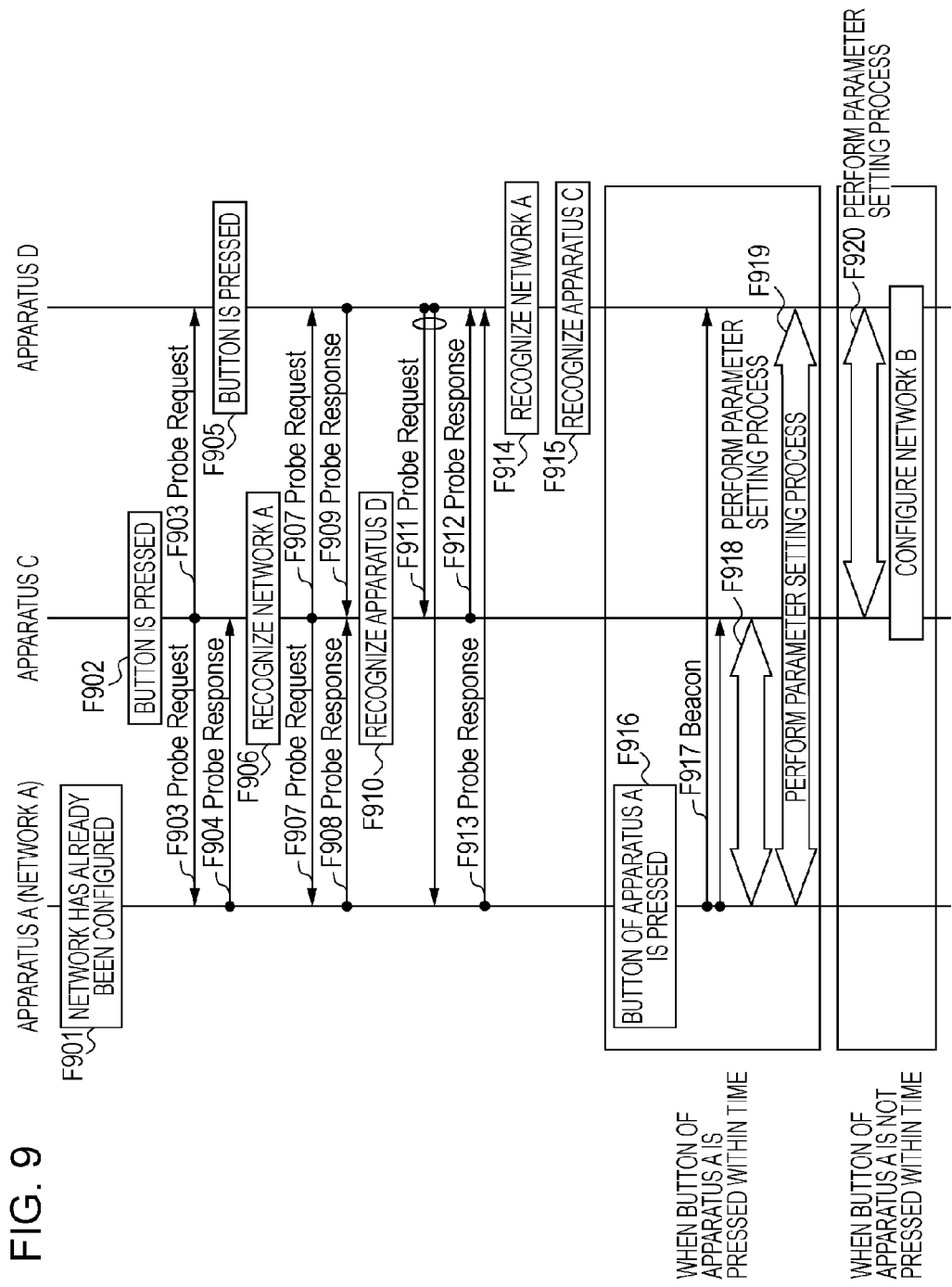
FIG. 9 is a processing sequence diagram between apparatuses according to the first embodiment.

FIG. 9 is a diagram illustrating an exemplary processing sequence performed by the apparatus A, which is an apparatus that provides communication parameters of the network A, which has already been configured, and by the apparatuses C and D.

The apparatus A has already configured the network A with the apparatus B (F901). In order to configure the network A, the apparatus A has already performed an automatic setting process with the apparatus B. As has been described above, in the description of the present embodiment, it is assumed that, upon configuring the network A, the apparatus A operates as a communication-parameter providing apparatus and the apparatus B operates as a communication-parameter receiving apparatus.

In an environment in which the network A has already been configured, the user of the apparatus C operates the setting button 106 in order to perform an automatic setting process (F902). The apparatus C whose setting button 106 has been operated starts an automatic setting process.

First, in order to search for a partner apparatus with which the automatic setting process is to be actually performed, the apparatus C broadcasts a probe request (F903). This probe request includes information indicating that the sender (apparatus C) is currently performing an automatic setting process.

The apparatus A sends a probe response in response to the probe request from the apparatus C (F904). Since the setting button 106 of the apparatus A has not been operated, the probe response sent from the apparatus A includes no information indicating that the sender (apparatus A) is currently performing an automatic setting process.

The apparatus C receives the probe response from the apparatus A, whereby the apparatus C recognizes that the network A has been configured in the neighborhood (F906). Also, the apparatus C recognizes that the apparatus A, which sent the probe response, is not currently performing an automatic setting process. A method of determining that the apparatus A has configured the network A will be described later.

At the same time, the user of the apparatus D operates the setting button 106 in order to perform a communication-parameter automatic setting process (F905).

Since the apparatus C periodically performs a network search process, even after the setting button 106 of the apparatus D is operated, the apparatus C may again broadcast a probe request in order to search for a network (F907). In this case, the apparatus A sends a probe response (F908), and additionally, the apparatus D sends a probe response (F909). The probe response sent from the apparatus D includes information indicating that the sender (apparatus D) is currently performing an automatic setting process, since the probe response is sent after the setting button 106 of the apparatus D is operated.

Therefore, the apparatus C receives the probe response from the apparatus D, whereby the apparatus C recognizes the presence of the apparatus D, which is currently performing an automatic setting process.

Now, methods used by the apparatus C to distinguish the network A and the apparatus D will be described. For example, there are two methods, which will be described below.

First Method

Sending of a probe request and receiving of a probe response in steps F903 to F909 are performed a plurality of times within a time sufficiently longer than a beacon interval. Since the network A has been configured by the apparatuses A and B, probe responses with the same BSSID are sent from different media access control (MAC) addresses of the apparatuses A and B. In this case, it can be determined that there exists the network A configured by the apparatuses A and B. When probe responses with the same BSSID are coming from only the same MAC address (MAC address of the apparatus D in the present embodiment), and when an IE indicating that the sender is currently performing an automatic setting process is added to each of the probe responses, it can be determined that there exists the apparatus D currently performing an automatic setting process. In other words, it can be determined that the corresponding BSSID is used by only one apparatus that is currently performing a communication-parameter automatic setting process.

Second Method

A communication apparatus that has configured or participated in a network by performing a communication-parameter automatic setting process sends a probe response including special information. The special information may be information element (IE) indicating that a network has been configured in which communication parameters have been set by performing an automatic setting process, or information element (IE) indicating the number of communication apparatuses with which an automatic setting process has been performed and to which communication parameters have been provided.

In this way, a communication apparatus having received a probe response can examine the received information and determine the presence of the network A and the presence of the apparatus D. For example, when a received probe response includes an IE indicating that a network has been configured in which communication parameters have been set by performing an automatic setting process, the network A can be determined. When a received probe response includes no IE indicating that a network has been configured in which communication parameters have been set by performing an automatic setting process, but includes an IE indicating that the sender is currently performing an automatic setting process, the apparatus D, which has started a communication-parameter automatic setting process, can be determined. When a received probe response includes an IE indicating that the number of communication apparatuses with which an automatic setting process has been performed and to which communication parameters have been provided is one or more, the network A can be determined. When a probe response does not include such an IE but includes an IE indicating that the sender is currently performing an automatic setting process, the apparatus D, which has just started an automatic setting process, can be determined. These IEs may be totally new elements or may be existing IEs. Furthermore, the network A and the apparatus D may be determined by combining the first method and the second method.

Now, referring back to FIG. 9, the apparatus D whose setting button 106 has been operated in step F905 starts an automatic setting process, as in the apparatus C. That is, in order to search for a partner apparatus with which the communication-partner automatic setting process is to be performed, the apparatus D broadcasts a probe request (F911). Since the probe request includes information indicating that the sender is currently performing an automatic setting process, the apparatus C receives this signal and recognizes the apparatus D, which is currently performing an automatic setting operation.

The apparatus C sends a probe response (F912), and additionally, the apparatus A sends a probe response (F913). Since the apparatus A is not currently performing an automatic setting process, the probe response includes no information indicating that the sender (apparatus A) is currently performing an automatic setting process. Therefore, the apparatus D receives the probe response from the apparatus A, whereby the apparatus D recognizes that the network A has been configured in the neighborhood (F914). Also, since the apparatus C is currently performing an automatic setting process, the probe response sent from the apparatus C includes information indicating that the sender (apparatus C) is currently performing an automatic setting process. Therefore, the apparatus D receives the probe response from the apparatus C, whereby the apparatus D recognizes that there exists the apparatus C, which is currently performing an automatic setting process, in the neighborhood (F915).

Both the apparatuses C and D recognize that there exists in the neighborhood the network A configured by communication-parameter automatic setting, and another apparatus that has started a communication-parameter automatic setting process.

Therefore, the apparatuses C and D monitor for a certain time whether the apparatus A, which is a communication-parameter providing apparatus in the network A, starts a communication-parameter providing process.

When the user of the apparatus A operates the setting button 106 (F916), the apparatus A broadcasts a signal indicating that the apparatus A has started a communication-parameter providing function (F917). This broadcast is performed by, for example, sending a beacon signal including information indicating the start of a providing function. Alternatively, a probe request, a probe response, or another signal including information indicating the start of a providing function may be sent. This broadcast signal includes the BSSID of the network A. Therefore, an apparatus that receives the broadcast signal can recognize that the broadcast signal is from an apparatus belonging to the network A. By broadcasting this signal, the apparatus A notifies peripheral apparatuses of the presence of the apparatus A, and performs a process illustrated in FIG. 6, which will be described later.

The apparatuses C and D having received the broadcast signal in step F917 recognize that the apparatus A in the network A has started a communication-parameter providing function. The apparatuses C and D having recognized that the apparatus A has started a providing function perform a communication-parameter automatic setting process with the apparatus A (F918 and F919). When the apparatuses C and D wish to perform an automatic setting process with the apparatus A, the apparatuses C and D request the apparatus A to provide communication parameters. Upon receipt of this request, the apparatus A provides communication parameters of the network A to the apparatuses C and D. Accordingly, the apparatuses C and D receive, from the apparatus A, communication parameters for participating in the network A and additionally participate in the network A.

In contrast, when the setting button 106 of the apparatus A is not operated within the certain time, the apparatuses C and D mutually perform a communication-parameter automatic setting process (F920). With this automatic setting process, one of the apparatuses C and D operates as a communication-parameter providing apparatus, and the other one operates as a communication-parameter receiving apparatus. The providing apparatus provides communication parameters to the receiving apparatus. With these communication parameters, a new network B is configured.

In this case, which one of the apparatuses C and D operates as a providing apparatus or a receiving apparatus may be determined dynamically or in advance.

Prior to step F918 or F919 and prior to step F920, the display unit 105 of the apparatus C or D may display a confirmation message for the user to confirm that a communication-parameter providing process will start. In this case, the apparatus C or D waits for the setting button 106 to be operated again. When the setting button 106 is operated again, a providing process is performed. By adding this operation, a communication-parameter providing process can be promptly started according to the user's intention.

The time during which the apparatuses C and D wait for the apparatus A to start a communication-parameter providing process may be reduced in response to a user operation. For example, a confirmation message such as "Do you want to configure a new network with the apparatus D?" is displayed on the display unit 105 of the apparatus C, and the user selects whether to configure a new network. Alternatively, "There already is the network A. Do you want to participate in this network?" is displayed on the display units 105 of the apparatuses C and D, and the users select whether to participate in the existing network. Alternatively, "There already is the network A. Do you want to participate in this network? Or do you want to configure a new network?" is displayed on the display units 105 of the apparatuses C and D, and the users select whether to participate in the existing network or to configure a new network. In this way, the users select whether to participate in the existing network or to configure a new network. In accordance with this selection, a communication-parameter automatic setting process is performed. That is, in accordance with this selection, communication parameters are received from a providing apparatus in the existing network, or apparatuses having just started communication-parameter automatic setting perform a communication-parameter automatic setting process. In this way, the time until communication parameters are automatically set can be reduced, and the apparatuses can promptly participate in the existing network or configure a new network.

In another example, when the setting buttons 106 or the input units 109 of the apparatuses C and D are operated in a predetermined specific pattern, the apparatuses C and D may promptly configure a new network, independently of the network A.

A process may be performed to make it clearer for the user to distinguish whether the apparatus C has additionally participated in the network A or has configured a new network with the apparatus D. For example, apparatuses belonging to the same network may indicate that they belong to the same network by displaying, on the display units 105 thereof, a certain pattern or color using a light emitting diode (LED).

In the present embodiment, an active scan scheme of sending a probe request and receiving a probe response, thereby determining a partner apparatus, has been described as the network search process. Instead of this active scan scheme, a passive scan scheme of receiving a beacon and a probe response and determining a partner apparatus may be used. Alternatively, other network search methods may be used. A search may be conducted by using a combination of the active scan scheme and the passive scan scheme.

In succession to the description of the entire sequence diagram, a process performed by each apparatus will be described using a flowchart.

Figure 6:
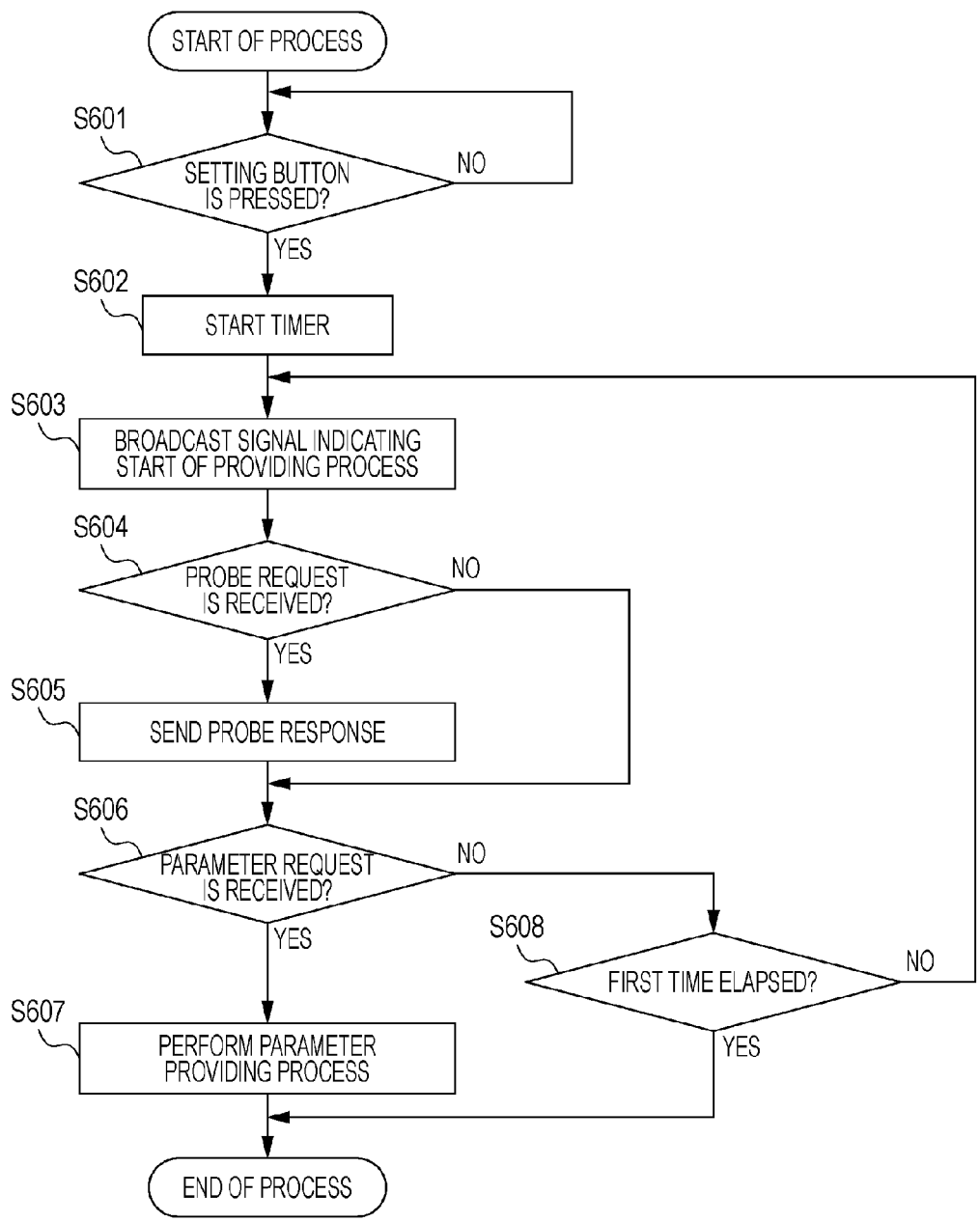
FIG. 6 is a flowchart illustrating a process performed by an apparatus A.

FIG. 6 is a flowchart illustrating a process performed by the apparatus A, which is a communication-parameter providing apparatus. The process of the flowchart illustrated in FIG. 6 is performed when the control unit 102 of the apparatus A executes a control program stored in the storage unit 103. Also, the process of the flowchart illustrated in FIG. 6 is performed by each function block illustrated in FIG. 2, which operates in accordance with its role.

The process is performed when the apparatuses A and B configure the network A, and, after the network A is configured, when communication parameters are provided to the apparatus C or D.

The control unit 102 of the apparatus A monitors whether the setting button 106 is pressed by the user (S601). Upon detection of pressing of the setting button 106 (S601), the control unit 102 starts a communication-parameter automatic setting process using the communication-parameter automatic setting function block 202. The apparatus A functions as an apparatus that provides communication parameters for configuring the network A. The control unit 102, which has started the automatic setting process, starts counting the time of a time limit of the automatic setting process (first predetermined time) (S602). When the first predetermined time expires, the communication-parameter automatic setting process is terminated. When the automatic setting process is started, the control unit 102 broadcasts a signal indicating the start of a communication-parameter providing function (S603). For example, the control unit 102 sends a beacon signal including information indicating the start of a providing function. The apparatus A waits for reception of a probe request (S604). Upon receipt of the probe request, the apparatus A sends, as a response to the probe request, a probe response including additional information indicating that the apparatus A is currently performing a communication-parameter automatic setting process and the apparatus A has started a providing function (S605). Sending of the probe response is one type of broadcasting a signal indicating the start of a providing process. In contrast, when no probe request is received, the flow proceeds to step S606.

A beacon or a probe response including information indicating the start of a providing function is a probe response sent by a providing apparatus during an automatic setting process. When no providing function has been started yet, a beacon or a probe response that does not include the above information is sent.

A communication-parameter receiving apparatus that has received the beacon or probe response including the additional information sends a communication-parameter automatic setting start request to the communication-parameter providing apparatus in order to request the providing apparatus to provide communication parameters. Therefore, the apparatus A waits for the arrival of a communication-parameter automatic setting start request (request for providing communication parameters) (S606).

The apparatus A having received the automatic-setting start request (S606) starts a process for sharing the communication parameters with the receiving apparatus (S607). That is, the apparatus A performs a process to provide the communication parameters to the receiving apparatus (S607). In contrast, when the foregoing start request is not received, the apparatus A determines whether the first predetermined time has elapsed since detection of pressing the setting button 106 (S608). When the first predetermined time has not elapsed, the flow returns to step S603. When the first predetermined time has elapsed without receiving the foregoing start request, the automatic setting process is terminated. In this case, the apparatus A terminates the process without providing the communication parameters.

The additional information indicating that the sender is currently performing a communication-parameter automatic setting process is additional information indicating that a communication-parameter automatic setting function is effective. Whether the setting button 106 is pressed may be one parameter included in the additional information.

Figure 7:
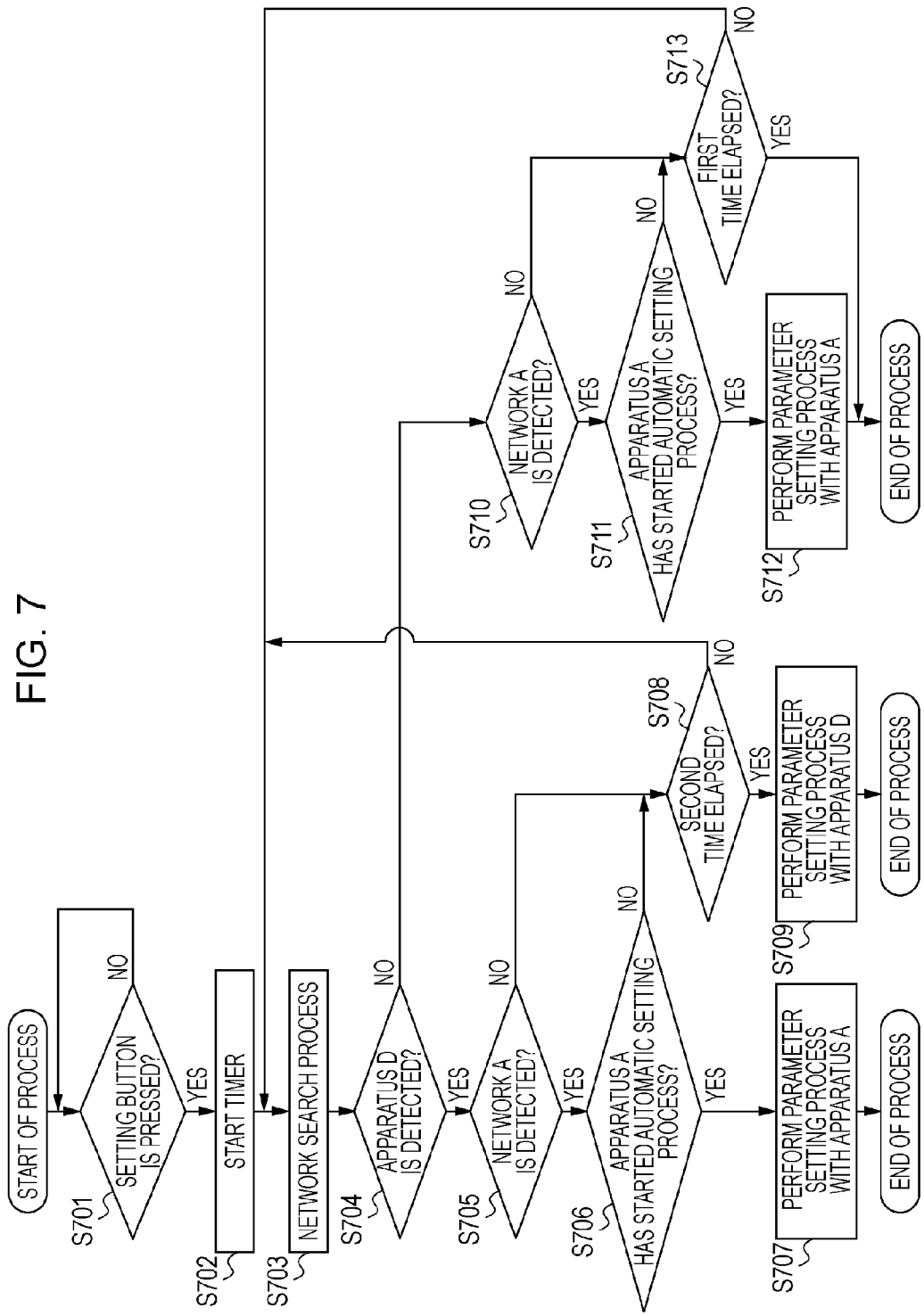
FIG. 7 is a flowchart illustrating a process performed by an apparatus C according to a first embodiment.

FIG. 7 is a flowchart illustrating an operation of the apparatus C for performing the sequence illustrated in FIG. 9. Although FIG. 7 is described as a flowchart illustrating the operation of the apparatus C, the apparatus D operates in a similar manner. The process of the flowchart illustrated in FIG. 7 is performed when the control unit 102 of the apparatus C executes a control program stored in the storage unit 103. Also, the process of the flowchart illustrated in FIG. 7 is performed by each function block illustrated in FIG. 2, which operates in accordance with its role.

The control unit 102 of the apparatus C monitors whether the setting button 106 is operated or pressed by the user (S701). Upon detection of pressing of the setting button 106, the control unit 102 starts a communication-parameter automatic setting process using the communication-parameter automatic setting function block 202. The control unit 102 having started the automatic setting process starts counting the time of a time limit of the communication-parameter automatic setting process (first predetermined time) and a time limit of determining whether an apparatus in an existing network has started a communication-parameter providing function (second predetermined time) (S702). When the first predetermined time expires, the communication-parameter automatic setting process is terminated. The second predetermined time is shorter than the first predetermined time.

After the timer has started, the control unit 102 of the apparatus C performs a network search process in order to detect a communication apparatus that has started an automatic setting process (S703). The network search process is performed by, for example, sending a probe request, receiving a probe response, and receiving a beacon signal, as has been described above.

By checking information added to the probe response and the beacon signal, a providing apparatus that has started a communication-parameter automatic setting process can be detected. The probe request including additional information indicating that the sender is currently performing an automatic setting process is sent. In this way, an apparatus that has received the probe request can detect a receiving apparatus that has started a communication-parameter automatic setting process.

As a result of the network search process in step S703, it is determined whether the apparatus D, which has not completed the communication-parameter automatic setting process, is detected (S704).

When the apparatus D is detected in step S704, it is determined whether the network A exists, besides the apparatus D (S705).

Detection of the apparatus D and detection of the network A may be performed by using the same network search result or by performing different search processes.

When the network A is detected in step S705, it is determined whether a providing apparatus that manages communication parameters of the network A, which has already been configured, has started a providing function (S706). That is, it is determined whether the providing apparatus has started an automatic setting process.

As the determination process, for example, the details of a beacon signal or a probe response from the apparatus A, which is the providing apparatus, are determined, whereby whether the setting button 106 of the apparatus A has been pressed can be determined. The communication-parameter providing apparatus may not necessarily be the apparatus A and may be the apparatus B, which exists in the same network A. When the determination process in step S706 determines that the apparatus A has started an automatic setting process and thus can provide parameters, the apparatus C performs a communication-parameter automatic setting process with the apparatus A (S707). With this automatic setting process, the apparatus C receives communication parameters of the network A from the apparatus A, and the apparatus C participates in the network A. In order that the apparatus C can perform an automatic setting process with the apparatus A, the apparatus C requests the apparatus A to provide communication parameters. The apparatus A having received the request provides communication parameters to the apparatus C.

In contrast, when the determination process in step S706 determines that the providing function of the apparatus A has not been activated yet, it is determined whether the second predetermined time has elapsed (S708). When the second predetermined time has not elapsed, the flow returns to step S703, and the network search process is continuously performed. When the apparatus A does not start its providing function before the second predetermined time elapses (S708), the apparatus C performs a communication-parameter automatic setting process with the apparatus D (S709). Accordingly, a new network B is configured by the apparatuses C and D. Even when the network A is not detected before the second predetermined time elapses (S705 and S708), the apparatus C performs a communication-parameter automatic setting process with the apparatus D and configures a new network B (S709).

When the presence of the network A and the presence of the apparatus D are detected by performing the search process in step S703, the search process may be terminated, and whether an apparatus participating in the network A starts a providing function may be monitored until the second predetermined time elapses.

Even when the apparatus D is not detected in step S704, whether the network A exists is determined (S710).

Detection of the apparatus D and detection of the network A may be performed by using the same network search result or by performing different search processes. When the network A is detected in step S710, it is determined whether a providing apparatus that manages communication parameters of the network A, which has already been configured, has started a providing function (S711). That is, it is determined whether a providing apparatus in the network A has started an automatic setting process.

When the determination process in step S711 determines that the apparatus A, which is a providing apparatus, has started a providing function, and thus can provide parameters, the apparatus C performs an automatic setting process with the apparatus A (S712) and participates in the network A.

In contrast, when the determination process in step S710 does not detect the network A, or when the determination process in step S711 determines that the providing function of the apparatus A has not been activated yet, it is determined whether the first predetermined time has elapsed (S713). When the first predetermined time has not elapsed (S713), the flow returns to step S703, and the network search process is performed again. When the first predetermined time has elapsed (S713), the apparatus C performs no automatic setting process, and terminates the process.

As above, according to the present embodiment, when there already exists a network configured by a communication-parameter automatic setting process, whether a new communication apparatus participates in this existing network or configures a new network with another new communication apparatus can be explicitly controlled. That is, when the user starts the providing function of a providing apparatus in an existing network, a new communication apparatus can receive communication parameters provided from the providing apparatus in the existing network. Thus, the new communication apparatus can participate in the existing network. Also, when the providing function of a providing apparatus in an existing network is not started, new communication apparatuses instructed by users to perform an automatic setting process can perform a communication-parameter automatic setting process. Thus, the new communication apparatuses can configure a new network.

Second Embodiment

In the first embodiment, the case where whether a communication-parameter providing apparatus in an already existing network has started a communication-parameter providing function is determined has been described. That is, the case where whether a button that triggers the start of a providing function is pressed in the providing apparatus in the existing network is determined has been described. In a second embodiment, an example in which a time during which the existing network is configured is taken into consideration, and which network to participate in is determined will be described.

In the second embodiment, the apparatus configuration, the network configuration, and the processing sequence performed by the apparatuses are the same as those in the first embodiment. The process performed by the apparatus A is the same as that in the first embodiment.

Figure 8:
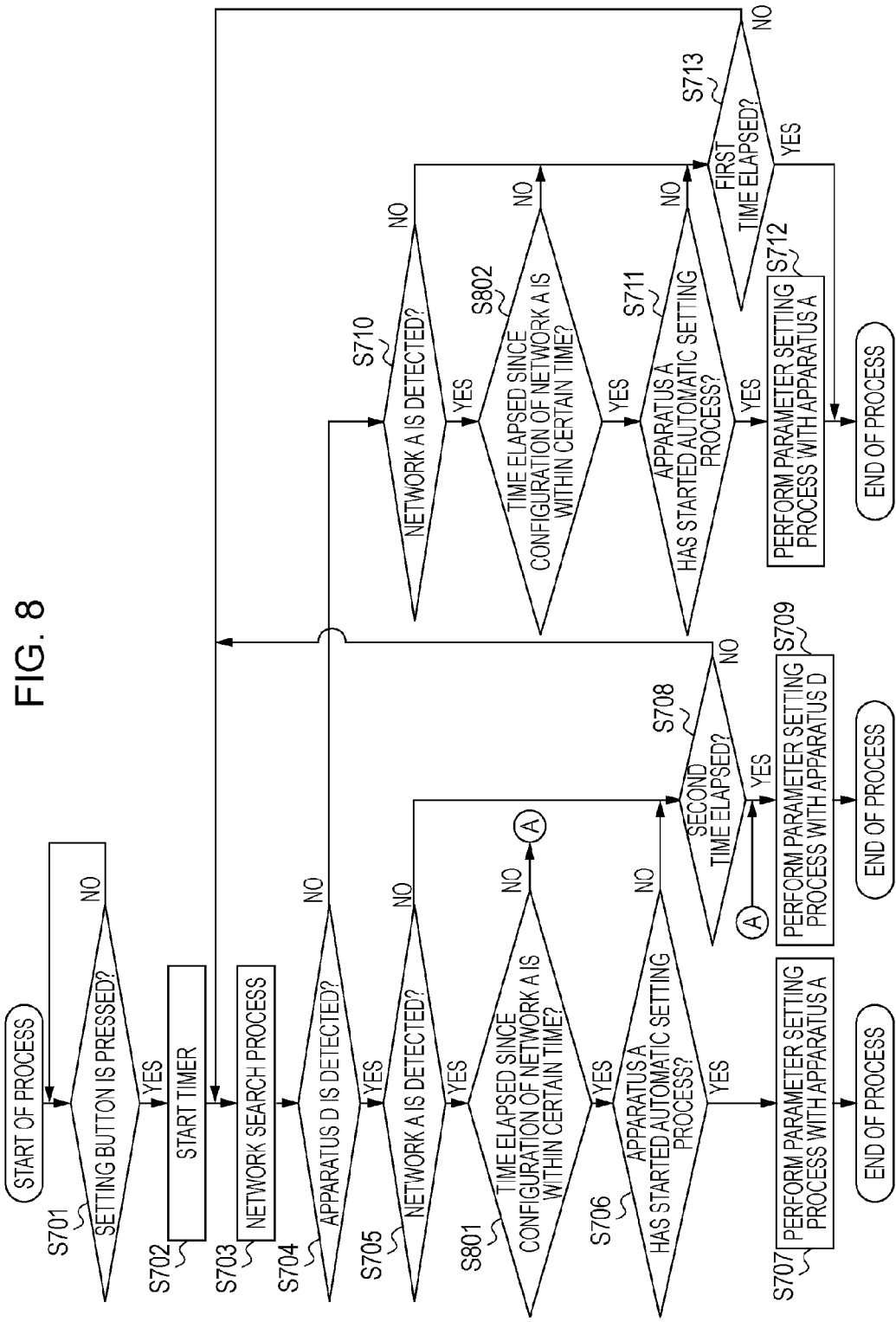
FIG. 8 is a flowchart illustrating a process performed by the apparatus C according to a second embodiment.

In the second embodiment, however, the processes performed by the apparatuses C and D are different from those in the first embodiment. FIG. 8 is a flowchart illustrating an operation of the apparatus C in the second embodiment.

Referring to FIG. 8, the flow of the operation of the apparatus C in the second embodiment will be described. Although FIG. 8 is described as a flowchart illustrating the operation of the apparatus C, the apparatus D operates in a similar manner. Steps in FIG. 8 that are the same as those in FIG. 7 are given the same reference numerals as those in FIG. 7. The process of the flowchart illustrated in FIG. 8 is performed when the control unit 102 of the apparatus C executes a control program stored in the storage unit 103. Also, the process of the flowchart illustrated in FIG. 8 is performed by each function block illustrated in FIG. 2, which operates in accordance with its role.

The control unit 102 of the apparatus C monitors whether the setting button 106 is operated or pressed by the user (S701). Upon detection of pressing of the setting button 106, the control unit 102 starts a communication-parameter automatic setting process using the communication-parameter automatic setting function block 202. The control unit 102 having started the automatic setting process starts counting the time of a time limit of the communication-parameter automatic setting process (first predetermined time) and a time limit of determining whether an apparatus in an existing network has started a communication-parameter providing function (second predetermined time) (S702). When the first predetermined time expires, the communication-parameter automatic setting process is terminated. The second predetermined time is shorter than the first predetermined time.

After the timer has started, the control unit 102 of the apparatus C performs a network search process in order to detect a communication apparatus that has started an automatic setting process (S703). The network search process is performed by, for example, sending a probe request, receiving a probe response, and receiving a beacon signal.

By checking information added to the probe response and the beacon signal, a providing apparatus that has started a communication-parameter automatic setting process can be detected. The probe request including additional information indicating that the sender is currently performing an automatic setting process is sent. In this way, an apparatus that has received the probe request can detect a receiving apparatus that has started a communication-parameter automatic setting process.

As a result of the network search process in step S703, it is determined whether the apparatus D, which has not completed the communication-parameter automatic setting process, is detected (S704).

When the apparatus D is detected in step S704, it is determined whether the network A exists, besides the apparatus D (S705).

Detection of the apparatus D and detection of the network A may be performed by using the same network search result or by performing different search processes.

When the network A is detected in step S705, the apparatus C determines how much time has elapsed since the configuration of the network A (S801).

For example, the following process is performed as a process of determining the time elapsed since the configuration of the network A.

In the wireless LAN network conforming to the IEEE 802.11 standard, a timer called a timer synchronization function (TSF) timer is defined. The time taken to configure a network can be measured on the basis of the value of this timer. The TSF is inherently a function used to synchronize wireless LAN terminals.

The TSF timer is added in a time stamp field in a packet frame of IEEE 802.11. The TSF timer is a 64-bit counter and performs counting up to $2^{64}$ microseconds.

In the time stamp field, the value is cleared to zero at the time an IBSS network is configured, and the value is incremented when there is a network. After $2^{64}$ microseconds elapse, the counter is reset to zero.

The period of $2^{64}$ microseconds is about 584554 years. Therefore, this period is sufficient for determining how much time has elapsed since the configuration of a network. Therefore, the apparatus C refers to the time stamp field added to a packet of a beacon or a probe response in the network A, whereby the apparatus C can determine the time elapsed since the configuration of the network A.

When it is determined in step S801 that the network A has been configured within a certain time (e.g., one hour) since the start of a communication-parameter automatic setting process performed by the apparatus C, the flow proceeds to step S706. In step S706, it is determined whether a communication-parameter providing apparatus that manages communication parameters of the network A, which has already been configured, has been performing a providing function. That is, it is determined whether the providing apparatus has started an automatic setting process.

As the determination process, for example, the details of a beacon signal or a probe response from the apparatus A, which is the providing apparatus, are determined, whereby whether the setting button 106 of the apparatus A has been pressed can be determined.

When the determination process in step S706 determines that the apparatus A has started an automatic setting process and thus can provide parameters, the apparatus C performs a communication-parameter automatic setting process with the apparatus A (S707). With this automatic setting process, the apparatus C receives communication parameters of the network A from the apparatus A, and the apparatus C participates in the network A. In order that the apparatus C can perform an automatic setting process with the apparatus A, the apparatus C requests the apparatus A to provide communication parameters. The apparatus A having received the request provides communication parameters to the apparatus C.

In contrast, when the determination process in step S801 determines that the time elapsed since the configuration of the network A is greater than or equal to the certain time, the apparatus C does not participate in the network A, and performs a communication-parameter automatic setting process with the apparatus D (S709). Accordingly, a new network B is configured by the apparatuses C and D.

In contrast, when the determination process in step S706 determines that the providing function of the apparatus A has not been activated yet, it is determined whether the second predetermined time has elapsed (S708). When the second predetermined time has not elapsed, the flow returns to step S703, and the network search process is continuously performed. When the apparatus A does not start its providing function before the second predetermined time elapses (S708), the apparatus C performs a communication-parameter automatic setting process with the apparatus D (S709). Accordingly, a new network B is configured by the apparatuses C and D. Even when the network A is not detected before the second predetermined time elapses (S705 and S708), the apparatus C performs a communication-parameter automatic setting process with the apparatus D and configures a new network B (S709).

When the presence of the network A and the presence of the apparatus D are detected by performing the search process in step S703, and when the network A has been configured within the certain time (e.g., one hour) since the start of the communication-parameter setting process performed by the apparatus C, the search process is terminated. Whether an apparatus participating in the network A starts a providing function before the second predetermined time elapses may be monitored.

Even when the apparatus D is not detected in step S704, whether the network A exists is determined (S710).

Detection of the apparatus D and detection of the network A may be performed by using the same network search result or by performing different search processes.

When the network A is detected in step S710, the apparatus C determines how much time has elapsed since the configuration of the network A (S802).

When it is determined in step S802 that the network A has been configured within the certain time, it is determined whether a providing apparatus that manages communication parameters of the network A, which has already been configured, has been performing a providing function (S711).

When the determination process in step S711 determines that the apparatus A, which is a providing apparatus, has started a providing function, and thus can provide parameters, the apparatus C performs a communication-parameter automatic setting process with the apparatus A (S712) and participates in the network A. In order that the apparatus C can perform an automatic setting process with the apparatus A, the apparatus C requests the apparatus A to provide communication parameters. The apparatus A having received the request provides communication parameters to the apparatus C.

In contrast, when the determination process in step S710 does not detect the network A, it is determined whether the first predetermined time has elapsed (S713). In contrast, when the determination process in step S802 determines that the time elapsed since the configuration of the network A is greater than or equal to the certain time, or when the determination process in step S711 determines that the providing function of the apparatus A has not been activated yet, it is determined whether the first predetermined time has elapsed (S713). When the first predetermined time has not elapsed (S713), the flow returns to step S703, and the network search process is performed again. When the first predetermined time has elapsed (S713), the apparatus C performs no automatic setting process, and terminates the process.

According to this embodiment, when there already is a network configured by a communication-parameter automatic setting function and the time at which that network is configured is near the time at which an automatic setting process is started, it is made easier for a new communication apparatus to participate in the existing network. When a long time has elapsed since the configuration of the existing network, new communication apparatuses can configure a new network. In this way, for example, apparatuses of users who have gathered within a certain time can configure a new network, independent of a network that has already been configured by users who have gathered before the certain time.

In the foregoing description, when the existing network is a network configured within the certain time, a new communication apparatus participates in that network. However, when the existing network is a network configured before the certain time, a new communication apparatus may participate in that network. Alternatively, the user may be allowed to specify a time at which or a time interval during which a network is configured. In this way, if there is a network configured at that time or within that time interval, the user's apparatus may participate in that network. In this case, if there is no network configured at the specified time (or within the specified time interval), new communication apparatuses configure a new network.

As above, in accordance with the time at which an existing network is configured, switching can be performed between participation in the existing network and configuration of a new network. Therefore, communication can be performed with a communication partner selected by taking into consideration the time at which the existing network is configured.

In particular, when there is a plurality of new apparatuses wishing to participate in a network, the new apparatuses are prevented from configuring different networks. This is effective to configure a temporary network, such as a meeting in which many people participate.

The description of the foregoing embodiments concerns the case where the wireless LAN conforming to IEEE 802.11 is used by way of example. However, the present invention is applicable to other wireless media such as a wireless universal serial bus (USB), MultiBand Orthogonal frequency-division multiplexing (OFDM) Alliance (MBOA), Bluetooth (registered trademark), ultra-wideband (UWB), and Zigbee. Alternatively, the present invention is applicable to a wired communication medium such as a wired LAN.

UWB includes a wireless USB, wireless 1394, WiNET, and the like.

Although the network identifier, the encryption method, the encryption key, the authentication method, and the authentication key serve as communication parameters in the description of the foregoing embodiments, other information may serve as communication parameters. That is, communication parameters include other information.

According to the present invention, a storage medium having recorded thereon a program code of software that realizes the foregoing functions is supplied to a system or apparatus, and a computer (central processing unit (CPU) or microprocessing unit (MPU)) of the system or apparatus reads and executes the program code stored on the storage medium. In this case, the program code itself read from the storage medium realizes the foregoing functions of the embodiment, and the storage medium having the program code recorded thereon constitutes the present invention.

According to the present invention, when there already is a network configured by a communication-parameter automatic setting function, whether to participate in the existing network or to configure a new network can be selected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-151823, filed Jun. 10, 2008, which is hereby incorporated by reference herein in its entirety.

The invention claimed is:

1. A communication apparatus comprising:
a search device configured to search for another communication apparatus;
a determining device configured to determine, in case that a first communication apparatus in a first network having been already configured by setting a communication parameter is detected by the search device, whether the first communication apparatus has started a communication parameter setting process; and
a performing device configured to perform, in case that the first communication apparatus has started the communication-parameter setting process, the communication parameter setting process with the first communication apparatus, and, in case that the first communication apparatus does not start the communication parameter setting process before a predetermined time elapses, perform the communication parameter setting process with a second communication apparatus that is not participating in the first network and that has started the communication-parameter setting process.

2. The communication apparatus according to claim 1, wherein the communication apparatus performs wireless communication with the second communication apparatus conforming to IEEE802.11 series, using a communication parameter set by the performing device.

3. The communication apparatus according to claim 1, wherein a communication parameter set by the performing device includes a network identifier, an encryption key, an encryption method, an authentication key and an authentication method used by the communication apparatus to perform wireless communication with the second communication apparatus.

4. A control method for a communication apparatus, the method comprising:

determining, in case that a first communication apparatus in a first network having been already configured by setting a communication parameter is detected, whether the first communication apparatus starts a communication-parameter setting process; and performing, in case that the first communication apparatus starts the communication-parameter setting process, the communication-parameter setting process with the first communication apparatus, and, in case that the first communication apparatus does not start the communication-parameter setting process before a predetermined time elapses, performing the communication-parameter setting process with a second communication apparatus that is not participating in the first network and that has started the communication-parameter setting process.

* * * * *